United States Patent [19]

Norris

[11] 4,021,965
[45] May 10, 1977

[54] FERTILIZER AND PESTICIDE DISPENSING STAKE

[76] Inventor: Frank W. Norris, Horse Cove Road, Highlands, N.C. 28741

[22] Filed: Aug. 6, 1975

[21] Appl. No.: 602,417

[52] U.S. Cl. .................. 47/48.5; 43/131; 47/47; 239/58; 239/60
[51] Int. Cl.² ............... A01G 29/00; A01G 17/04; A01M 1/20
[58] Field of Search ............... 47/47, 44, 48.5, 46, 47/27, 24, 34, 42, 43; 43/131, 108, 132 R, 126; 111/7.1, 7.2; 239/57, 58, 60, 34; 71/64 A

[56] References Cited

UNITED STATES PATENTS

| | | | |
|---|---|---|---|
| 1,358,928 | 11/1920 | Boehm | 239/58 |
| 1,706,444 | 3/1929 | Dietrich | 239/58 X |
| 2,022,937 | 12/1935 | Kirkpatrick | 47/24 |
| 2,082,712 | 6/1937 | McIvor | 47/44 UX |
| 2,145,934 | 2/1939 | Kingman | 47/48.5 |
| 2,734,769 | 2/1956 | Holz | 239/57 |
| 3,188,771 | 6/1965 | Ballai | 47/48.5 X |
| 3,273,284 | 9/1966 | Anagnostou | 47/34 |
| 3,345,774 | 10/1967 | Delbuguet | 47/44 X |
| 3,821,863 | 7/1974 | Chan | 47/48.5 |
| 3,837,574 | 9/1974 | Curran | 239/57 |
| 3,914,900 | 10/1975 | Bigelow et al. | 47/48.5 X |

FOREIGN PATENTS OR APPLICATIONS

| | | | |
|---|---|---|---|
| 177,553 | 2/1954 | Austria | 47/44 |
| 68,769 | 8/1892 | Germany | 47/44 |
| 463,132 | 7/1928 | Germany | 239/58 |
| 170,368 | 10/1921 | United Kingdom | 47/43 |

Primary Examiner—Edgar S. Burr
Assistant Examiner—Steven A. Bratlie
Attorney, Agent, or Firm—Birch, Stewart, Kolasch & Birch

[57] ABSTRACT

A plant support stake is provided with integral support means in the form of plant ties and integral dispensing means for fertilizer and pesticides in the provision of a complete growth support system of an adjacent plant throughout the entire growth and bearing cycle of the plant.

9 Claims, 7 Drawing Figures

FERTILIZER AND PESTICIDE DISPENSING STAKE

NATURE OF THE INVENTION

This invention relates to self fertilizing support means for tomato plants and the like including multi-stage insecticide applying means for self-application of insecticide to plants supported thereby during various growth stages of the plants.

BACKGROUND OF THE INVENTION

In the past, a number of support stakes for growing tomatos and the like have been developed which include reservoirs for water and fertilizer and mounting means for accessories such as plant supports or ties. None of these prior art devices provide complete plant support, feeding and protective systems, however. It is not sufficient merely to feed and water plants. To produce optimum yields of vegetables and the like, it is necessary to nourish, support and protect the plants from pests which otherwise materially hinder the productivity of the plant.

Thus, there is an established need in the art for a total growth enhancing, physical support and pest inhibiting module, particularly for small home gardens, where optimum yield is essential to achieve a viable food producing arrangement. There is a corresponding need for a reliable and inexpensive structure for such a module.

OBJECTS OF THE INVENTION

It is an object of the present invention to provide a new and novel growth support module for plants.

Another object of the present invention to provide a new and novel growth support module for plants such as tomato plants and the like wherein physical support, plant nutrition and pest control are all effected by self contained means.

Another object of the present invention is to provide novel plant support stake having a multi-compartmented structure to which permits selective dispensing of plant nutrients and pesticides over the entire growth cycle of an associated plant.

These and other objects of the present invention will become more fully apparent with reference to the following specification and drawings which relate to preferred embodiments of the invention.

SUMMARY OF THE INVENTION

An elongated two-piece stake structure having a plurality of isolated internal cavities along the length thereof is provided with a plurality of outwardly extending release ports connecting the various cavities to the exterior of the stake structure.

The lowermost cavity is filled with a time release fertilizer such as in cartridge form with the release ports between the cavity and the exterior of the stake initially sealed. Ground mounting of the stake is accomplished in cooperation with a steel or iron spike shaped ground anchor driven into the ground in the bottom of a planting excavation and a longitudinal bore is defined in the bottom end wall of the stake to telescopically receive the upper end of the ground anchor.

The entire lower cavity is intended to be placed below the soil line on the ground anchor and the seals ruptured in the release ports to permit the dispensing of fertilizer therethrough in response to normal watering of the adjacent plant.

The above-ground upper section of the stake includes end-to-end cavities or other individually defined internal areas containing various pesticides, with the release ports associated with those cavities initially sealed.

Where the adjacent plant is first planted, the lowermost of the above-ground cavities is opened by rupturing the seals and pesticide of a suitable time release type is dispensed therethrough by the normal action of air flowing about the stake.

As the height of the growing plant increases, additional seals in the various release ports are ruptured to provide pesticide protection to the plant at all growth levels on an as needed basis.

Integral ties of the wire reinforced twist type are built into the supporting stake structure at various heights to provide support to the stalks or stems of an adjacent plant and may be impregnated with insecticide or the like to provide additional protection.

DETAILED DESCRIPTION OF THE INVENTION

Figure 1:
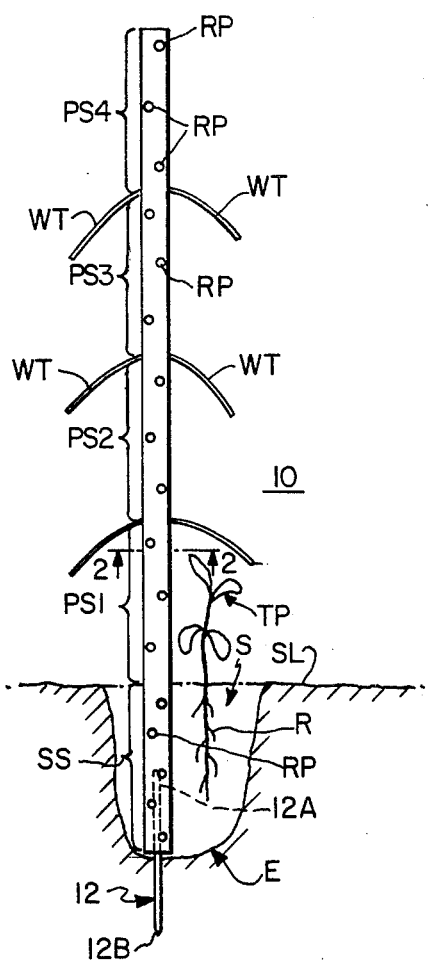
FIG. 1 is a front elevational view of the support stake of the present invention in the ground adjacent to a plant to be sustained, protected and supported thereby.

Referring in detail to the drawings and with particular reference to FIG. 1, the plant sustaining, protecting and support stake 10 of the present invention is shown as having an elongated tubular configuration of either rectangular or circular cross section having a subsoil section SS, from whence first, second, third and fourth pesticide sections PS1, PS2, PS3 and PS4 extend in vertical sequence.

The pesticide sections define different vertical growth dimensions of a tomato plant TP or the like having its roots R positioned in the soil S immediately adjacent the subsoil section SS of the stake 10.

The subsoil section SS is center-bored or relieved along the longitudinal axis of the stake 10 to telescopically receive the upper end 12A of an iron or steel spike-shaped ground anchor 12, the latter having its lowermost end 12B imbedded in the subsoil at the bottom of a planting excavation E.

The entire stake 10 is either hollow or provided with a plurality of internal cavities in each of the sections SS, PSL–PS4 thereof and the interior of the stake 10 is connected to the exterior through a plurality of release ports RP formed through the walls of the stake 10.

A plurality of wire reinforced ties WT are integrally attached to the stake 10 and extend outwardly thereof for a length sufficient to wrap around the stalk or stem of the plant TP at various heights attained by the latter adjacent the stake 10.

Figure 3:
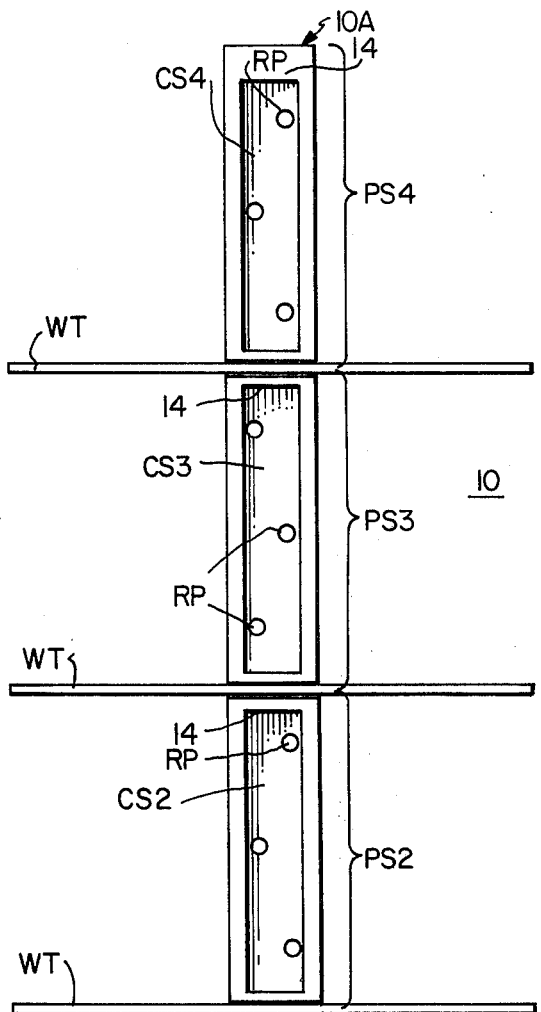
FIG. 3 is a top plan view of the interior structure of one-half of a preferred embodiment of the two piece stake of the present invention with a ground anchor positioned adjacent one end thereof.
Figure 2:
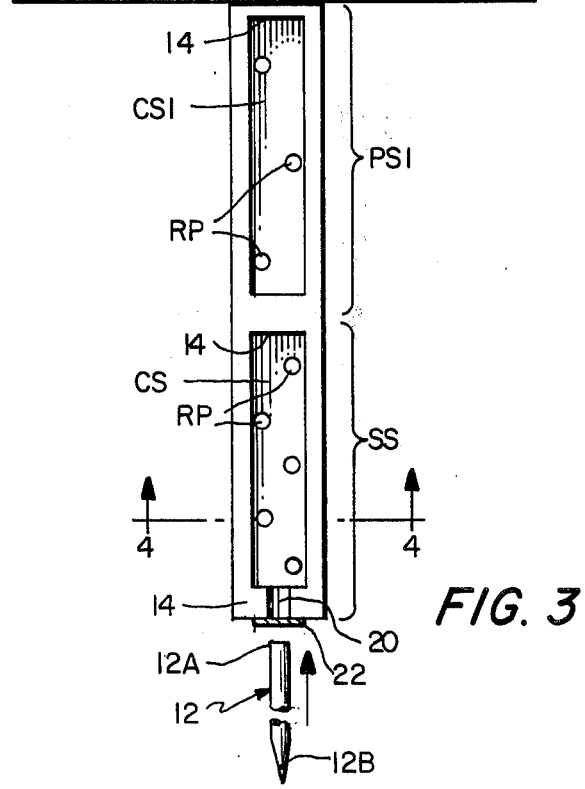
FIG. 2 is a cross-sectional view taken along line 2—2 of FIG. 1.

Referring additionally to FIGS. 2 and 3, the stake 10 is shown to be composed of two elongated conformal sections 10A and 10B (FIG. 2), one of the sections 10A being fully illustrated in FIG. 3. The sections 10A and 10B are fastened together by any suitable means in the provision of the integral stake structure 10.

The conformal main section 10A is identical with the section 10B and is shown in FIG. 3 as comprising an elongated rectangular solid such as a 1 inch by 2 inch board having elongated rectangular cavities CS, CS1–CS4 formed therein in the confines of the fertilizer and pesticide sections SS, PS1–PS4, respectively. The plurality of release ports RP previously described extend through the walls of the cavities CS, CS1–CS4 such that the contents of these cavities may be exposed to the atmosphere surrounding the stake 10. The cavities CS, CS1–CS4 are separated within the main section 10A by integral partitions 14 and the other main section 10B includes like mating partitions shown in FIG. 2, which abut one another in registry to define the cavities CS, CS1–CS4 as shown in FIG. 2 for the cavity CS1.

The cavities CS, is filled with fertilizer of the time release type and the cavities CS1–CS4 are filled with pesticide. In order for the contents of the said cavities to escape through the release ports RP, these ports must be open. However, until the stake 10 is ready to be used, the cavities CS, CS1–CS4 should be sealed to prevent loss of this material therethrough. This is accomplished by placing a rupturable sealing means such as paper or plastic tape over the release ports RP either within or externally of the said cavities.

Figure 4:
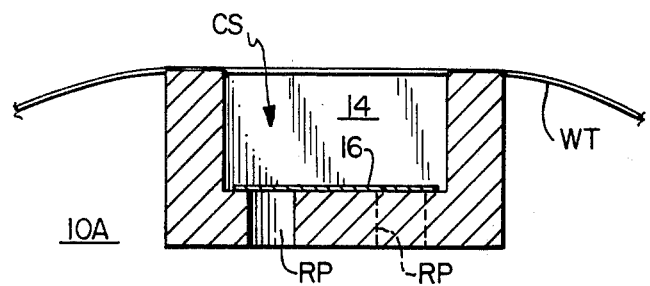
FIG. 4 is an enlarged cross-sectional detail of FIG. 3 taken along line 4—4 thereof and illustrating a preferred sealing means for the release ports in the support stake of the present invention.

As shown in FIG. 4, there is a rupturable tape 16 or the like positioned over the release ports RP within the cavity CS in the subsoil section SS of the stake 10. Like sheathing or sealing means is provided for all of the release ports RP throughout the length of the stake 10.

Figure 5:
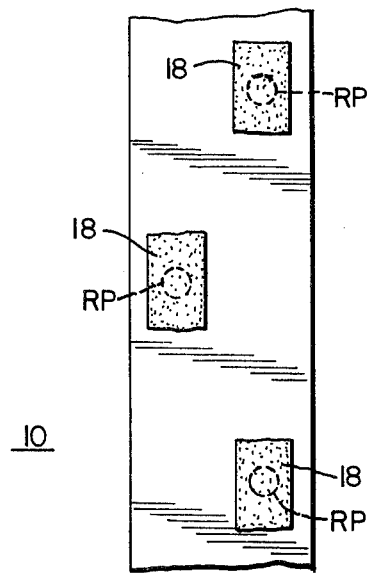
FIG. 5 is an enlarged fragmented view of a surface portion of the support stake of FIG. 3 illustrating another preferred embodiment of sealing means for the release ports.

Alternatively, as shown in FIG. 5, bits of rupturable tape 16 or the like may be placed over the release ports RP on the exterior surface of the stake 10.

The stake 10 also includes a spike receiving port 20 defined through the lower end thereof in the fertilizer containing subsoil cavity CS by conformal grooves formed in the lowermost end partitions 14 in each of the main sections 10A and 10B. A rupturable tape 22 or the like is placed across the spike receiving port 20 which prevents leakage of fertilizer contained in the chamber CS through the spike port 20. To impale the stake 10 on the spike 12 as shown in FIG. 1, the stake 10 is merely forced against the upper end 12A of the spike 12 to rupture the tape 22 and permit the spike 12 to enter the cavity CS through the spike port 20.

The wire reinforced plant ties WT may be integrated with the stake 10 by laying the said ties WT over the integral partitions 14 to be clamped therebetween when the main stake sections 10A and 10B are integrally assembled.

Figure 7:
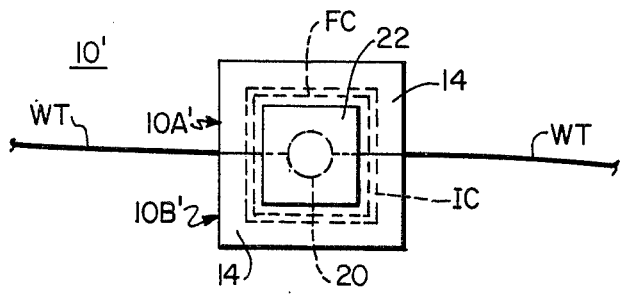
FIG. 7 is a bottom end view of a complete support stake embodying the details of FIG. 6.
Figure 6:
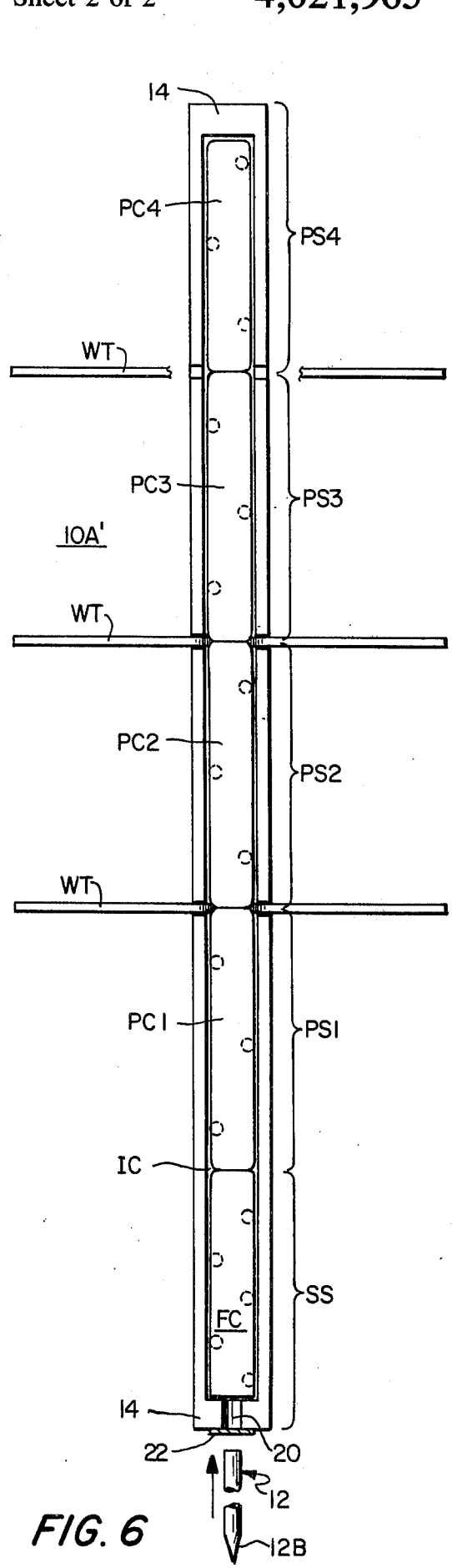
FIG. 6 is a top plan view of the interior of another preferred embodiment of the support stake of the present invention.

Referring now to FIGS. 6 and 7, an alternate embodiment of a main stake section 10A of the present invention is shown as having a continuous internal cavity IC therein defined only by end partitions 14 and the external walls of the said main stake section 10 A. In this embodiment like numerals to the embodiment of FIGS. 1–5 denote like elements.

In this embodiment the subsoil areas SS of the stake section 10A' is defined within the cavity IC by a fertilizer cartridge FC consisting of fertilizer packaged in a rupturable wrapper; and the four pesticide sections PS1–PS4 are defined within the cavity IC by pesticide cartridges PC1–PC4, respectively, consisting of insecticide or the like packaged in rupturable wrappers.

The fertilizer and pesticide cartridges FC, PC1–PC4 are rendered operable by inserting a sharp object such as a common nail through the release ports RP into the cavity IC to produce holes in the wrappers of the said cartridges, whereby the fertilizer and pesticides contained therein will escape by the action of moisture and air, respectively, through the release ports RP to the root or above ground portions of the plant TP (FIG. 1) in the vicinity of those release ports RP through which the sharp object has been inserted.

A second main stake section 10B', which is a mirror image of the main section 10A', is integrally affixed to the main section 10A' to form a stake 10' having an end configuration as shown in FIG. 7. The wire reinforced plant ties WT are clamped between the sections 10A' and 10B' as shown to integrate them with the stake structure 10'.

Operation

The planting excavation E is formed in the ground and the steel or iron mounting spike 12 is embedded in the bottom of the excavation E. The release ports RP, or at least a predetermined number of them, in the subsoil section SS of the stake 10 (10') are opened by rupturing the sealing tapes 18 or rupturable wrapper 16 of the fertilizer cartridge FC and the spike receiving port 20 of the subsoil section SS is forced over the upper end 12B of the spike 12, rupturing the sealing tape 22 and/or the bottom wrapper portion of the fertilizer cartridge FC. This releases fertilizer from the cartridge FC through the spike receiving port 20 adjacent to the spike or ground anchor 12.

The tomato plant TP (FIG. 1) is then planted adjacent the stake in the excavation E and watered to start the fertilizing process.

The fertilizer is preferably of the time release type such that moisture ingested into the release ports RP from the soil S will cause fertilizer to slowly be absorbed into the soil S adjacent the roots R of the plant TP.

Once the plant is in place, depending upon its initial height, those release ports RP lying within the current growth height zone of the plant TP in the pesticide sections PS1–PS4 of the stake 10 (10') are opened by rupturing the tapes 16, 18 (FIGS. 4,5) or the wrappers of cartridges PC1–PC4 (FIGS. 6,7) to permit air to enter the chambers PC1–PC4 or IC and cause the pesticide therein to be exposed to the atmosphere.

The pesticide is preferably of a type which gradually sublimates under the action of air and moisture to exit the release ports RP onto and in the immediate vicinity of the plant TP over its present growing height to provide protection against pests.

As the plant TP increases in height, additional release ports RP are opened as discribed above until the plant TP has extended its height to a point at least coterminate with the above-ground height of the stake 10 (10'). The plant TP is supported by wrapping to ties WT around adjacent portions of the plant TP as the latter achieves the height of each of the said ties WT.

Since growing plants require soluble iron oxides for proper nutrition, the fertilizer in the subsoil section SS of the stake 10 (10') preferably contains a reagent which will chemically react with the mounting spike 12 to produce such oxides and enhance the fertilization of the plant TP.

After a given growing time such as a complete growing season the main stake sections 10A, 10B or 10A', 10B' are separated, the tape seals 16, 18 replaced the cavities CS, CS1-CS4 filled with new fertilizer and pesticides or the cavity IC refilled with fertilizer and pesticide cartridges FC, PC1-PC4 as required.

The wire-reinforced plant ties WT are also replaced at this time if necessary.

It should be understood that the rupturable cartridges FC, PC1-PC4 of the embodiment of FIGS. 6 and 7 may be placed in the respective cavities CS, CS1-CS4 in the embodiment of FIG. 3 as a further alternative to the use of sealing tapes 16, 18 to seal the release ports RP of the stake 10.

As can now be readily seen from the foregoing specification and drawings, the present invention provides a plant support stake which constitutes a complete growth support system for plants in conjunction with normal soil and moisture to speed, physically support and protect an adjacent plant during its entire growth and bearing cycle.

It is claimed:

1. Growth support stake means for nourishing, supporting and protecting a plant growing adjacent thereto comprising:
    elongated stake body means defined by first and second conformally shaped, coterminous, hollow mating sections defining an internal cavity means therebetween for retaining material within said stake means;
    release ports defined in said stake means connecting said internal cavity means with the exterior of said stake means;
    means internally dividing said stake body means and said internal cavity means into a subsoil portion and a plurality of above-ground portions;
    said subsoil portion for containing fertilizer and said above-ground portions for containing pesticide;
    elongated ground anchor means for supporting said stake body means in the ground;
    ground anchor receiving means defined in said stake body means in said subsoil portion thereof for removably receiving said ground anchor means; and
    plant tie means integral with said stake body means and selectively spaced thereon for engaging an adjacent plant at various growth heights thereof to support said plant on said stake body means and maintain said plant proximate to said above-ground portions thereof;
    wherein said cavity means is filled with fertilizer in said subsoil portion of said stake body means and with pesticide in said above-ground portions of said stake body means; and
    wherein said cavity means is further defined by first and second abutting internal partition means formed at opposed respective positions in said first and second stake body sections to thereby define a plurality of cavities between said partitions corresponding to said subsoil and above-ground portions.

2. The growth support stake means of claim 1, wherein said stake means further includes replaceable and rupturable sealing means overlying each of said release ports and selectively rupturable to permit said fertilizer and said pesticide to escape therethrough.

3. The growth support stake means of claim 2, wherein said sealing means comprises tape means overlying said release ports within said cavity.

4. The growth support stake means of claim 2, wherein said sealing means comprises tape means overlying said release ports externally of said stake body means.

5. The growth support stake means of claim 1, wherein said ground anchor means extends into said subsoil portion into engagement with said fertilizer contained therein;
    said ground anchor means containing iron.

6. The growth support stake means of claim 1, wherein said plant tie means are impregnated with insecticide.

7. Growth support stake means for nourishing, supporting and protecting a plant growing adjacent thereto comprising:
    elongated stake body means defined by first and second conformally shaped, coterminous, hollow mating sections defining an internal cavity means therebetween for retaining material within said stake means;
    release ports defined in said stake means connecting said internal cavity means the exterior of said stake means;
    means internally dividing said stake body means and said internal cavity means into a subsoil portion and a plurality of above-ground portions;
    said subsoil portion for containing fertilizer and said above-ground portions for containing pesticide;
    elongated ground anchor means for supporting said stake body means in the ground;
    ground anchor receiving means defined in said stake body means in said subsoil portion thereof for removably receiving said ground anchor means; and
    plant tie means integral with said stake body means and selectively spaced thereon for engaging an adjacent plant at various growth heights thereof to support said plant on said stake body means and maintain said plant proximate to said above-ground portions thereof;
    wherein said cavity means defined between said first and second conformally shaped sections extends substantially the length of said stake body means; and
    wherein said means internally dividing said internal cavity means also said subsoil and above-ground portions comprise, respectively, a preformed cartridge of fertilizer and a plurality of preformed cartridges of pesticide;
    said cartridges having rupturable wrappings precluding the contents of said cartridges from escaping through said release ports and being rupturable adjacent selected ones of said release ports to permit said contents to escape therethrough.

8. The growth support stake means of claim 7, wherein said ground anchor means extends into said subsoil portion of said cavity means through said wrapping of said fertilizer cartridge to release said fertilizer therein adjacent said ground anchor means through said ground anchor receiving means.

9. The growth support stake means of claim 7, wherein said plant tie means are impregnated with insecticide.

* * * * *